US007117024B1

(12) United States Patent
Dorfman

(10) Patent No.: US 7,117,024 B1
(45) Date of Patent: Oct. 3, 2006

(54) WIRELESS TELEPHONE COMMUNICATION WITH REDUCED ELECTROMAGNETIC ENERGY INPUT ON THE USER

(76) Inventor: Bertrand Dorfman, 444 E. 82nd St., Apt. 7-B, New York, NY (US) 10028

( * ) Notice: Subject to any disclaimer, the term of this patent is extended or adjusted under 35 U.S.C. 154(b) by 307 days.

(21) Appl. No.: 10/047,787

(22) Filed: Jan. 16, 2002

Related U.S. Application Data

(60) Provisional application No. 60/263,312, filed on Jan. 20, 2001.

(51) Int. Cl.
*H04M 1/00* (2006.01)

(52) U.S. Cl. ............................... 455/575.5; 455/575.1; 455/550.1; 455/90.3; 455/562.1; 343/702

(58) Field of Classification Search .................... 455/5, 455/90.3, 575.7, 575.5, 575.1, 562.1, 271, 455/550.1; 343/702
See application file for complete search history.

(56) References Cited

U.S. PATENT DOCUMENTS 5,940,039 A * 8/1999 Wang et al. ................ 343/702
6,061,579 A * 5/2000 Arai et al. ............... 455/575.7
6,181,283 B1 * 1/2001 Johnson et al. ............. 343/702
6,249,256 B1 * 6/2001 Luxon et al. ............... 343/702
6,731,920 B1 * 5/2004 Iwai et al. .................. 455/272
2002/0058539 A1 * 5/2002 Underbrink et al. ........ 455/575

* cited by examiner

*Primary Examiner*—Nay Maung
*Assistant Examiner*—Angelica M. Perez
(74) *Attorney, Agent, or Firm*—Reed Smith LLP

(57) ABSTRACT

A personal portable phone, such as a cell phone, has an antenna (and preferably two antennas) which are mounted on an antenna base that slides over the ear piece when the phone is not in use and slides to a protracted position when the phone is in use.

In a non-use state, the two antennas are rotated down flush with the antenna base.

When in use, and in a protracted state, the two antennas are rotated up to a position such that the plane of the antenna is perpendicular to the plane of the base and the plane of the ear piece. In that position, each antenna is used to transmit electromagnetic radiation in a conical pattern. The pattern shown is a circular cone having an included angle of about 30° to 60°. The axes of the two conical patterns are parallel to the plane of the antenna base and plane of the ear piece so that the two conical patterns miss the head of the user and only a minimal or trivial amount of electromagnetic radiation impinges on the head of the user.

11 Claims, 4 Drawing Sheets

WIRELESS TELEPHONE COMMUNICATION WITH REDUCED ELECTROMAGNETIC ENERGY INPUT ON THE USER

REFERENCE TO RELATED APPLICATION

This application claims the priority benefit of U.S. Provisional Application No. 60/263,312 filed 20 Jan. 2001 and entitled: Safe Wireless Telephone Communication.

BACKGROUND OF THE INVENTION

This invention relates to the method of implementing two-way wireless telecommunication, including but not limited to cellular and satellite telephones, while eliminating any contact with electromagnetic energy emanating from the wireless telephone by the user.

A typical situation to which this invention is addressed is one in which an individual is making a telephone call using a cellular or any type of wireless telephone. In order for the telephone to operate, an antenna is required as part of the equipment. This antenna enables the generation of electromagnetic energy into the atmosphere by the transmitter section of the wireless telephone and conversely couples electromagnetic energy, which has been transmitted into the atmosphere by other transmitters, to the receiver section of the same wireless telephone.

Wireless telephones generally use monopole antennas. These antennas radiate electromagnetic energy in a 360° three-dimensional pattern. As a result, a substantial percentage of the electromagnetic energy being transmitted by the wireless telephone makes contact with the user. Since the user is holding the telephone immediately adjacent to his or her ear, the greatest concentration of electromagnetic energy is directed to the head and hand of the user.

There is a widely believed and frequently asserted contention that continuous exposure to electromagnetic radiation can have adverse health effects on the human body. Although the data on this is not conclusive, particularly as to the relationship between dosage and effect, there is an appreciable amount of anecdotal evidence and a substantial theoretical basis for these assertions.

For an appreciable period of time there has been expressed concern as to the degree to which people using cell phones over any extended period of time are subjecting themselves to an adverse environmental impact.

A first group of proposals have been made to reduce the level of the transmitted radiation. A second group of proposals have been made to introduce shielding between the telephone involved and the individual using it. It is believed that appreciable work is being done along these lines by manufacturers of cell phones. However, these approaches create problems that produce disadvantages. A lesser level of transmitted radiation reduces range and also increases the likelihood of not making contact or being cut off. Shielding results in increased size and weight that tends to provide an instrument which would not be acceptable to the public, thereby minimizing any beneficial impact that might be derived from such a design.

Accordingly, it is a major object of this invention to provide a design for a cell phone which will substantially reduce the level of electromagnetic radiation received at the head of the user of the cell phone while substantially retaining the operating parameters of the instrument involved.

It is a related purpose of this invention to provide this improvement without detracting from the ease and convenience of use of the cell phone and in particular to avoid substantial increases in cost and weight.

BRIEF DESCRIPTION

In brief, the description illustrates a personal portable phone having the usual standard ear piece and mouthpiece. An antenna arrangement is illustrated in which first and second directional antennas are mounted on an antenna base. The antenna base slides along the ear piece between retracted and protracted positions.

In the retracted position, the antenna base covers the ear piece, the antennas are folded flush with the base and the phone is in its non-operative state.

When the phone is in its operative state, the antenna base is moved to a protracted position thereby exposing the ear piece for use. The antennas are flipped up from a position flush with the antenna base to a position extending perpendicular to the antenna base.

A first one of the two directional antennas is a patch type antenna that transmits electromagnetic energy as a cone of radiated energy in a first direction. The axis of the cone is parallel to the plane of the antenna base and to the plane of the ear piece. The cone has an included angle of approximately 30° to 60°. The cone of radiated energy misses the head of the user.

The second antenna is displaced from but is co-planar with the first antenna. It transmits a cone of electromagnetic radiation in a second direction 180° opposite from the direction in which the first cone of energy is transmitted. The axis of the cone of energy transmitted by the second antenna is parallel to the plane of the antenna base and the plane of the ear piece as well as being parallel to the axis of the energy transmitted by the first antenna. The second cone of transmitted energy has an included angle of about 30° to 60° and also misses the head of the user.

DESCRIPTION OF THE PREFERRED EMBODIMENTS

Figure 6:
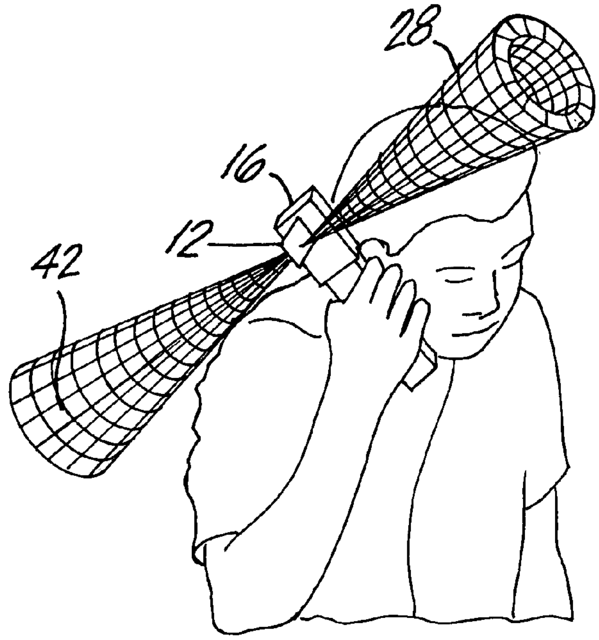
FIG. 6 schematically illustrates the relationship between the two conical transmitting envelopes and the head of the user.

The Figures, except for FIG. 6, all relate to the same embodiment. The embodiment described is a cell phone 10.

Figure 1:
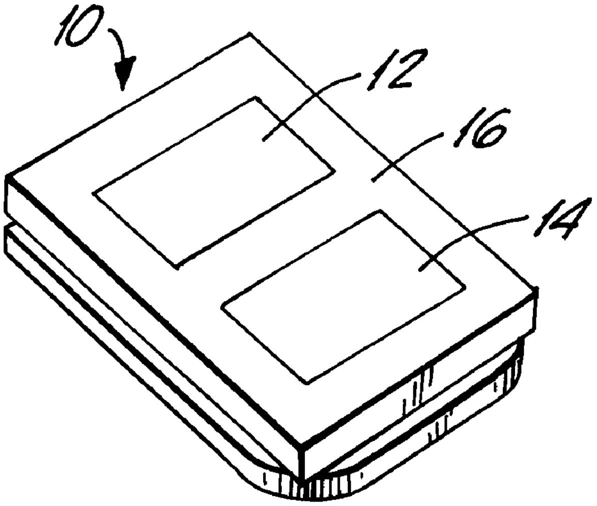
FIG. 1 is a perspective schematic illustration of a personal cellular telephone showing the two antennas 12, 14 in a flush condition against the antenna base. This is the condition when the telephone is in its closed non-used state.
Figure 2:
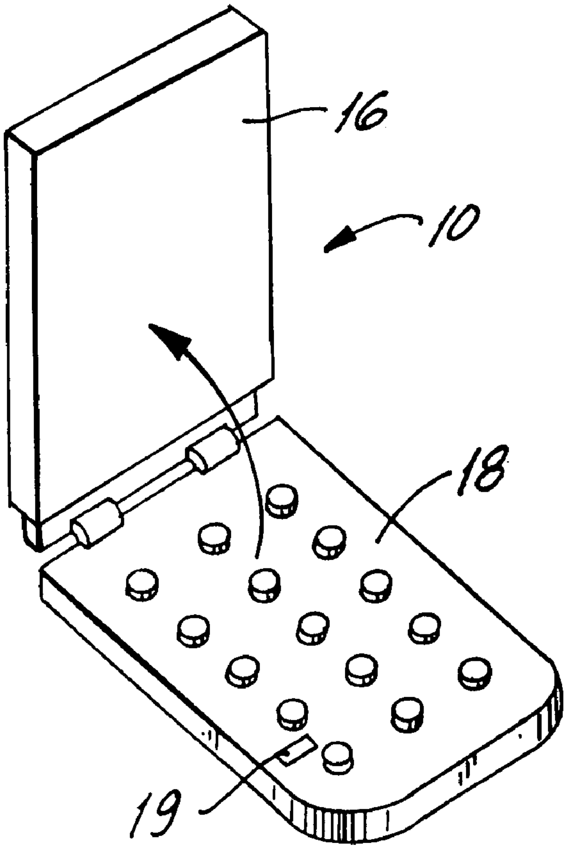
FIG. 2 is a schematic illustration of the FIG. 1 cellular telephone being opened preparatory to use.

As shown in FIG. 1, when the cell phone 10 is in a closed state, two antennas 12, 14 lie flush against an antenna base 16. When the phone 10 is to be used, the user swings open the two cell phone halves as shown in FIG. 2. This exposes the keyboard 18 and mouthpiece 19.

Figure 3:
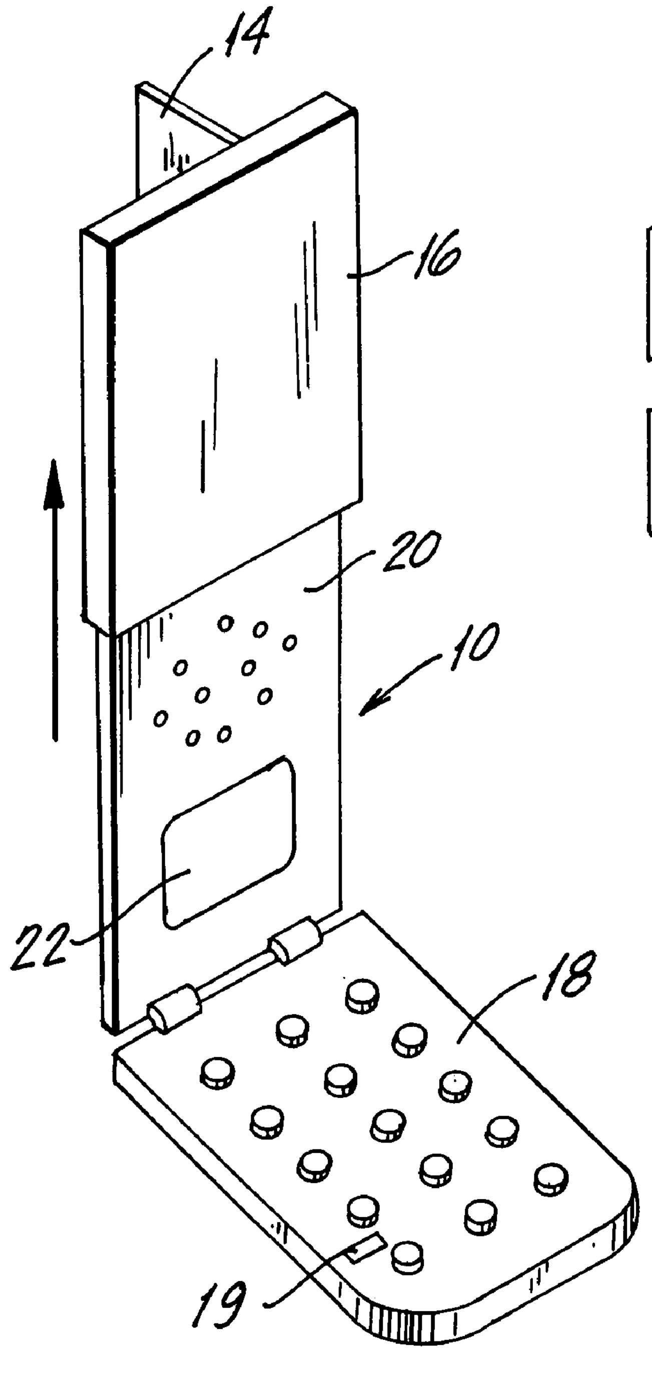
FIG. 3 is a schematic perspective view similar to that of FIG. 2 except that the antenna base 16 has been protracted to expose the ear piece 20.

As shown in FIG. 3, the user slides the antenna base 16 to a protracted position so that the ear piece 20 and screen 22 are exposed and the phone 10 is in condition to be used.

Figure 4:
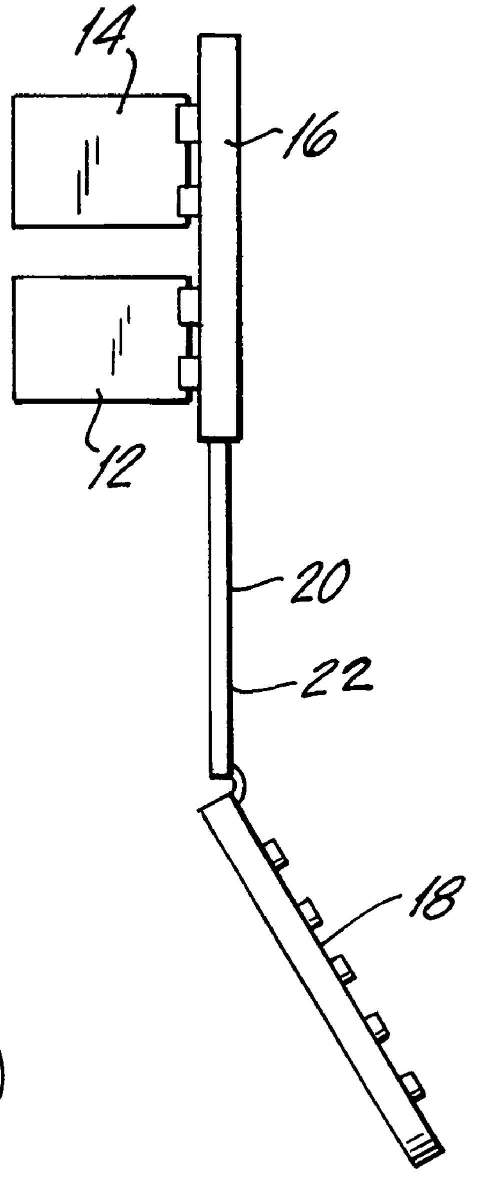
FIG. 4 is a schematic side view of the telephone in the open FIG. 3 state showing the two antennas in their operative position extending away from the antenna base.

As shown in FIG. 4, the two antennas 12, 14 are rotated up into a ready-to-transmit state. These two antennas 12, 14 are a known patch type of directional antenna. They are discussed in the text entitled: "Antenna Theory and Design" ($2^{nd}$ Ed.) by Stutzman and Theile, published by John Wiley and Sons (1998). Chapter 5 therein discusses, among other things, patch type antennas.

Figure 5:
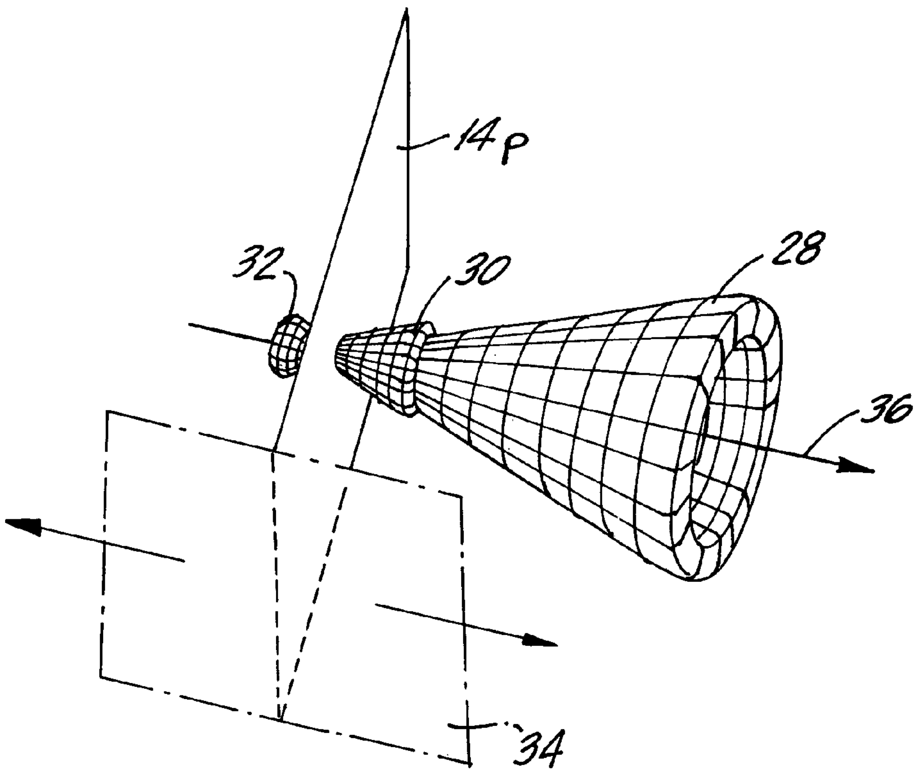
FIG. 5 is a schematic illustration of the radiation pattern of transmitted electromagnetic energy from one of the antennas.

Each antenna 12, 14 is designed to transmit information in a cone of radiated electromagnetic energy such as shown in FIG. 5. The antenna 14 is designed to transmit the cone in a forward direction and the antenna 12 in a backward direction. Two antennas thereby increase the likelihood of successful communication. However, a phone having only a single antenna, such as the antenna 14, would be operable and would perform the function of this invention.

As shown in FIG. 4, the directional antennas 12, 14 are arranged to be co-planar. The plane of the antennas 12, 14 is perpendicular to the plane of the base 16 and the plane of the ear piece 20.

FIG. 5 schematically illustrates the nature of the radiation pattern of a typical patch antenna that can be adapted for use with this invention. The main lobe 28, having the axis 36, contains the vast majority of the radiated energy and, in most cases, over 99% of the radiated energy. The amount of radiated energy in the side lobe 30 and in the rear lobe 32 is so low, perhaps 30 db down from the main lobe 28, as to be irrelevant to the object of this invention.

FIG. 5 shows the plane 14*p* of the antenna 14 so as to orient the radiation pattern illustrated. FIG. 5 shows the plane 34 in dash-dot form of the user's ear and shows the manner in which the conical radiation pattern, and in particular the main lobe 28, is displaced from the user's ear and radiates in a direction that will not engulf or contact the user's head.

FIG. 6 more clearly illustrates how the radiation cone 28 from the antenna 14 and cone 42 from the antenna 12 are configured and employed to essentially miss the head of the user. In one embodiment, the cones 28 and 42 are circular cones having an included angle of 30° to 60°.

Figure 7:
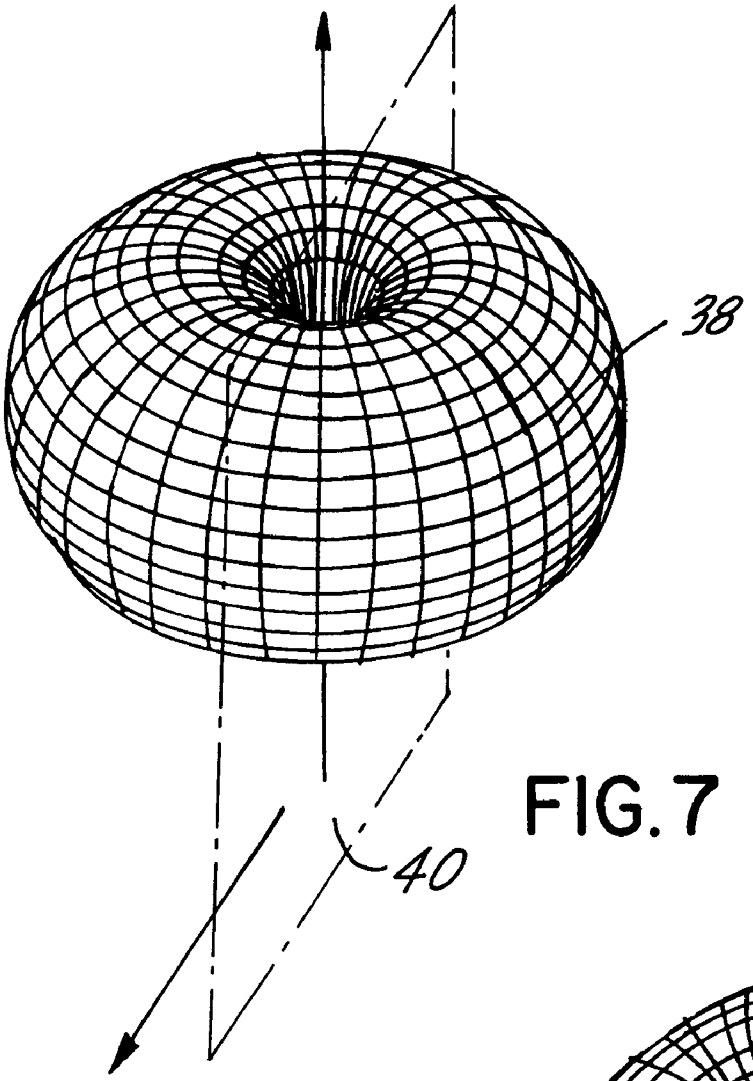
FIG. 7 schematically illustrates the kind of radiation pattern currently obtained from antennas in hand held or personal cellular telephones.

FIG. 7 provides an illustration of the radiation pattern 38 that is currently generated by the antennas used in present cell phones. In FIG. 7, line 40 illustrates the plane of the user's ear and shows how this traditional pattern 38 engulfs the head of the user.

Figure 8:
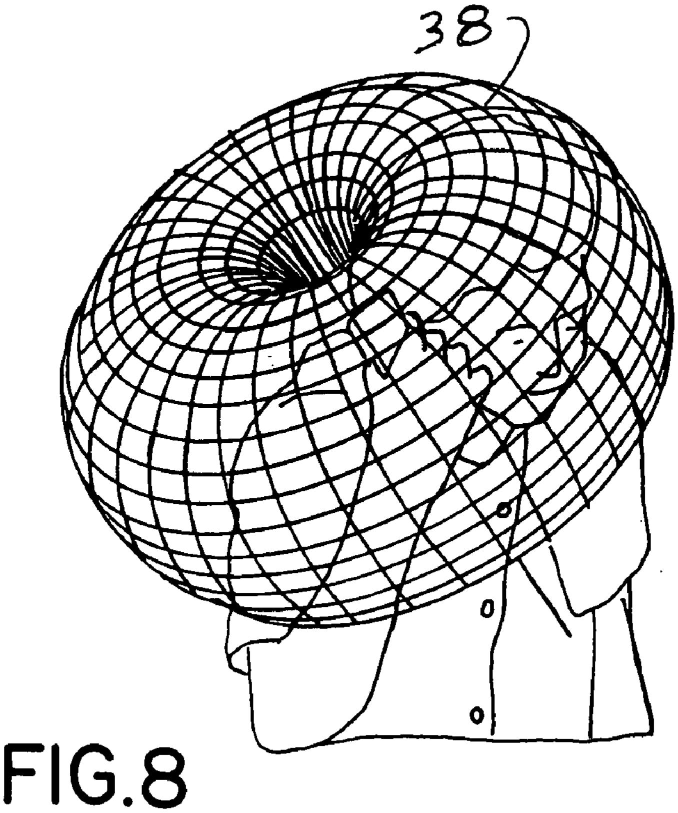
FIG. 8 schematically illustrates the manner in which the FIG. 7 pattern engulfs the head of the user.

FIG. 8 illustrates the manner in which the FIG. 7 radiation pattern 38 engulfs the head of the user.

A preferred embodiment of this invention employs a conical antenna radiation pattern. It is well known in the art as to what constitutes a conical pattern. The reference to a circular cone as being, for example, 15° from the axis or a 30° included angle refers to a well understood feature in the art as to what constitutes the parameter of the cone. There is some degree of radiation outside of the cone. But the art of designing antennas is such that substantially more than 90 percent of the radiated energy is within the cone specified and in many cases that can be 99 percent.

It should be understood, as used herein, that the term "conical" when applied to the radiation pattern refers not only to the preferred design of a circular cone but to other appropriate cones in which the closed curve defined by a plane perpendicular to the axis of the cone, may be a non-circular curve and may even be a polygon representing a pyramidal configuration.

Although this invention is described in connection with specific embodiments, it should be understood that the inventive concept is as set forth in the claims.

For example, although two antennas are distinctly preferred to obtain greater sensitivity and directional scope, a single antenna can be used consistent with the teachings of this invention to obtain the objectives thereof.

It is presently considered that an included angle of about 30° would be preferred. It should be understood that the optimum angle might be varied as a function of the particular telephone configuration, transmission needs and experience with which a user positions a personal telephone to stay outside of the cone of transmission.

What I claim is:

1. In a personal portable phone having an ear piece, the antenna improvement comprising:

a first directional antenna which is deployed substantially perpendicular to the plane of the ear piece when the antenna is deployed in its operative position, said first directional antenna when so deployed providing a first conical electromagnetic energy radiation pattern, said first conical pattern having a first included angle of less than 60° and an axis that is substantially perpendicular to the plane of said antenna and substantially parallel to the plane of the ear piece, said conical pattern encompassing substantially the sole radiation from said antenna, said first conical pattern substantially missing the head of the user when a user places the ear piece against the user's ear.

2. The improvement of claim 1 wherein: said first directional antenna is a patch type antenna.

3. The improvement of claim 2 wherein: said patch type antenna has an inoperative position flush with the face of said base in an inoperative state.

4. The improvement of claim 1 wherein: said first included angle is approximately 30°.

5. The antenna improvement of claim 1 further comprising:

a second directional antenna adjacent to said first antenna, said second antenna providing a second conical electromagnetic energy radiation pattern propagating in a direction substantially 180° from the direction in which said first conical electromagnetic radiation pattern propagates from said antenna, said second conical pattern having a second included angle of less than 60° and an axis that is substantially parallel to the plane of the ear piece, said second conical pattern encompassing substantially the sole radiation from said second antenna, said second conical pattern substantially missing the head of the user when a user places the ear piece against the user's ear.

6. The antenna improvement of claim 5 wherein: said first and second directional antennas are patch type antennas.

7. The antenna improvement of claim 5 wherein: said first and second included angle are each approximately 30°.

8. In a personal portable phone having an ear piece, the method of minimizing the impact of transmitted electromagnetic energy on the head of the user comprising the steps of:

providing a first patch antenna on a plane perpendicular to the plane of the ear piece, transmitting electromagnetic energy from said first antenna in a first substantially conical pattern having a first included angle of less than 60° and having a first axis, said first axis being substantially perpendicular on said plane of said patch antenna, and positioning said conical pattern so that said first axis is substantially parallel to the plane of the ear piece when the user places the ear piece against the user's ear and causing said conical pattern to substantially miss the head of the user.

9. The method of claim 8 wherein: said first included angle is approximately 30°.

10. The method of claim 8 further comprising the steps of providing a second patch antenna on said plane perpendicular to the plane of the ear piece, transmitting electromagnetic energy from said second antenna in a second substantially conical pattern having a second included angle of less than 60° and having a second axis, said second axis being substantially perpendicular to said plane of said patch antenna, and positioning said conical pattern so that said first axis is substantially parallel to the plane of the ear piece when the user places the ear piece against the user's ear and causing said conical pattern to substantially miss the head of the user.

11. The method of claim 10 wherein: said first and second included angles are each approximately 30°.

* * * * *